(12) United States Patent
Sloan

(10) Patent No.: US 8,815,040 B1
(45) Date of Patent: Aug. 26, 2014

(54) INK TRANSFER SYSTEM AND METHODS OF TRANSFERRING INK IMAGES TO SYNTHETIC TEXTILE MATERIALS

(71) Applicant: Donald D. Sloan, Platte City, MO (US)

(72) Inventor: Donald D. Sloan, Platte City, MO (US)

(73) Assignee: Donald D. Sloan, Platte City, MO (US), Trustee of the Donald D. Sloan Trust ( * ) Notice: Subject to any disclaimer, the term of this patent is extended or adjusted under 35 U.S.C. 154(b) by 0 days.

(21) Appl. No.: 14/020,501

(22) Filed: Sep. 6, 2013

(51) Int. Cl.
| | |
|---|---|
| *B41M 5/025* | (2006.01) |
| *B41M 5/42* | (2006.01) |
| *B41M 5/44* | (2006.01) |
| *C09J 11/06* | (2006.01) |

(52) U.S. Cl.
CPC ............. *B41M 5/0256* (2013.01); *B41M 5/423* (2013.01); *B41M 5/44* (2013.01); *C09J 11/06* (2013.01); *B41M 2205/10* (2013.01); *B41M 2205/40* (2013.01)
USPC ..... 156/235; 156/247; 428/32.51; 428/32.79; 524/331

(58) Field of Classification Search
CPC ...... B41M 5/0256; B41M 5/423; B41M 5/44; B41M 2205/10; B41M 2205/40; C09J 11/06
USPC ........ 428/32.12, 32.79, 32.51, 32.7; 156/235, 156/247; 524/323, 331
See application file for complete search history.

(56) References Cited

U.S. PATENT DOCUMENTS

| | | |
|---|---|---|
| 7,427,317 B2 | 9/2008 | Sloan |
| 7,431,759 B2 | 10/2008 | Sloan |
| 7,662,224 B2 | 2/2010 | Sloan |
| 8,092,003 B2 | 1/2012 | Sloan |
| 2012/0046378 A1 | 2/2012 | Sloan |
| 2013/0131211 A1 | 5/2013 | Sloan |

*Primary Examiner* — Bruce H Hess
(74) *Attorney, Agent, or Firm* — Hovey Williams LLP

(57) ABSTRACT

An ink-jettable adhesive composition comprising a polyurethane dispersion and a stabilizer is produced that can be used to form an image transfer system. The image transfer system generally comprises an adhesive layer formed from the adhesive composition, an ink image, and a removable transfer substrate. The image transfer system is capable of depositing the ink image and adhesive layer onto the surface of a textile. The resulting adhered ink image and adhesive layer can produce a durable and vivid image on a large variety of textiles.

28 Claims, 1 Drawing Sheet

INK TRANSFER SYSTEM AND METHODS OF TRANSFERRING INK IMAGES TO SYNTHETIC TEXTILE MATERIALS

BACKGROUND

1. Field of the Invention

The present invention generally relates to ink transfer systems and to methods for transferring ink images onto a surface of an article. More particularly, the present invention generally relates to adhesive compositions and ink image transfer systems produced therefrom.

2. Description of the Related Art

In the textile manufacturing industry, ink images are generally applied to various clothing articles by a number of different methods, and particularly through direct printing of an ink image onto the clothing article via screen printing and digital printing methods. While the direct printing methods can rapidly and efficiently produce a large number of clothing articles, the resulting products can exhibit a number of deficiencies and such printing methods are not suitable for all types of textiles. In some methods, particularly those involving digital printing onto the clothing article, the ink may be absorbed or penetrate too deeply into the textile. If the textile absorbs too much of the ink then the color and vividness of the deposited ink image will be diminished. In order to compensate for this, the thickness of the ink layer deposited is increased (e.g., greater than 20 mil using screen printing methods), which results in a raised image surface and texture that is not highly desirable.

Furthermore, these problems can be exacerbated when synthetic textile materials (e.g., polyester) are the target substrate. Also, many conventional inks, especially digital inks, do not adhere well to synthetic textile materials. Consequently, the resulting ink image produced on synthetic textiles lacks durability due to this poor adhesion. Additionally, the colors in the deposited ink image are generally less vivid and can change after being deposited on the synthetic textile. For example, white colors can appear grayer when deposited on colored polyester textile.

To address the shortcomings of direct printing, some have utilized image transfer systems to deposit an ink image onto a textile. Although conventional ink image transfer systems can be used on a wide variety of textiles, they also exhibit a number of deficiencies. For example, applying ink images using ink image transfer systems takes a considerable amount of time since each image must be applied with a separate transfer sheet. Thus, production methods utilizing ink image transfer systems are rather labor intensive and produce a lower output per hour compared to direct printing. Furthermore, many conventional image transfer systems have problems adhering the ink image to all types of textiles due to the adhesive limitations of such systems. Consequently, the deposited ink image may lack durability and can be damaged after multiple washings.

Accordingly, there is a need for a quick and efficient method for transferring an ink image onto a variety of textiles that does not compromise the quality of the deposited ink image.

SUMMARY

In one or more embodiments, the present invention concerns an ink-jettable adhesive composition. The composition comprises an ink-jettable polyurethane dispersion; and a phenol based on the following formula:

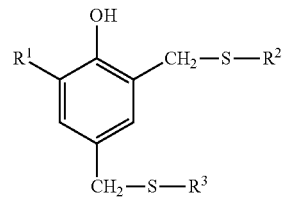

wherein $R^1$ is an alkyl group having 1 to 4 carbon atoms, $R^2$ is an alkyl group comprising 5 to 12 carbon atoms, and $R^3$ is an alkyl group comprising 5 to 12 carbon atoms. The adhesive composition has a viscosity at 25° C. of at least 8 and not more than about 60 centipoise.

In one or more embodiments, the present invention concerns an image transfer system for transferring an image to an article. The image transfer system comprises a removable transfer substrate; an ink image printed on at least a portion of the substrate; and an adhesive layer printed on at least a portion of the substrate and the ink image. The adhesive layer comprises a polyurethane and a phenol based on the following formula:

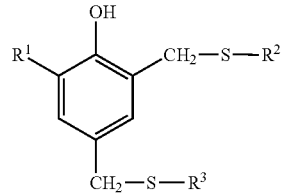

wherein $R^1$ is an alkyl group having 1 to 4 carbon atoms, $R^2$ is an alkyl group comprising 5 to 12 carbon atoms, and $R^3$ is an alkyl group comprising 5 to 12 carbon atoms.

In one or more embodiments, the present invention concerns a method for applying an image to an article. The method comprises: (a) providing an image transfer system comprising a removable transfer substrate, an ink image printed on at least a portion of the transfer substrate, and an adhesive layer printed on at least a portion of the transfer substrate and the ink image; (b) heat treating the image transfer system to adhere the adhesive layer of the image transfer system to a surface of the article; and (c) removing the transfer substrate from the image transfer system thereby leaving the adhesive layer and the ink image affixed on the article. In such embodiments, the adhesive layer is between the ink image and the surface of the article. The adhesive layer comprises a polyurethane and a phenol based on the following formula:

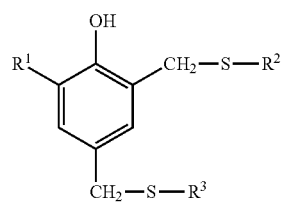

wherein $R^1$ is an alkyl group having 1 to 4 carbon atoms, $R^2$ is an alkyl group comprising 5 to 12 carbon atoms, and $R^3$ is an alkyl group comprising 5 to 12 carbon atoms.

In one or more embodiments, the present invention concerns an article having an image deposited thereon. The article comprises an adhesive layer affixed to a surface of the article and an ink image affixed to the adhesive layer, wherein the adhesive layer is between the ink image and the surface of the article. The adhesive layer comprises a polyurethane and a phenol based on the following formula:

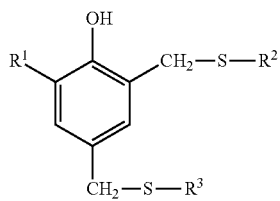

wherein $R^1$ is an alkyl group having 1 to 4 carbon atoms, $R^2$ is an alkyl group comprising 5 to 12 carbon atoms, and $R^3$ is an alkyl group comprising 5 to 12 carbon atoms.

BRIEF DESCRIPTION OF THE FIGURES

Embodiments of the present invention are described herein with reference to the following drawing figures, wherein.

DETAILED DESCRIPTION

Figure 1:
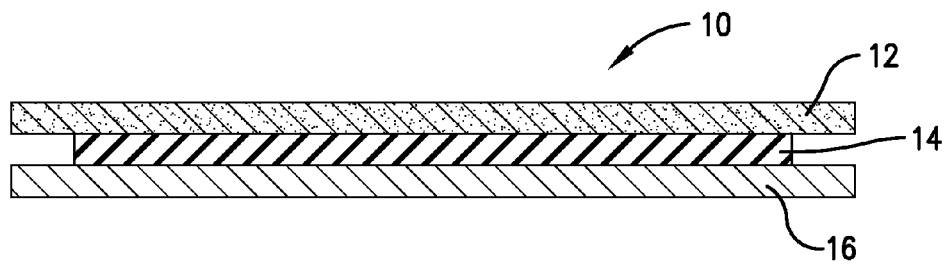
FIG. 1 depicts a side view of an exemplary image transfer system.

The present invention is generally directed to adhesive compositions and image transfer systems produced therefrom. The image transfer systems described herein can be used to apply ink images onto a variety of textile types that are vivid, colorful, and durable after multiple washings and dry cleanings. An exemplary image transfer system is depicted in FIG. 1, which shows an image transfer system 10 with an adhesive layer 12 that is formed from the adhesive composition described herein. As shown in FIG. 1, the adhesive layer 12 and an ink image 14 are layered on a removable transfer substrate 16 to form the image transfer system 10. It should be understood that the image transfer system shown in FIG. 1 is just one example of a system within which the adhesive composition described herein can be embodied. The adhesive composition may find application in a wide variety of other systems where an ink-jettable adhesive may be utilized.

The Adhesive Composition

While the adhesive compositions described herein can comprise a variety of components, the adhesive compositions generally comprise at least a polyurethane and a stabilizer.

The polyurethane can function as a thermally-activated adhesive in the adhesive compositions described herein. In various embodiments, the adhesive composition can comprise at least about 5, 10, 25, or 35 and/or not more than about 90, 75, 60, or 45 weight percent of the polyurethane. More particularly, the adhesive composition can comprise in the range of about 5 to 90, 10 to 75, 25 to 60, or 35 to 45 weight percent of the polyurethane.

The polyurethane can be in the form of an aqueous dispersion comprising the polyurethane. In such embodiments, the polyurethane dispersion can comprise at least about 20, 30, or 45 and/or not more than 95, 80, or 65 weight percent of water. More particularly, the polyurethane dispersion can comprise in the range of about 20 to 95, 30 to 80, or 45 to 65 weight percent of water.

In one or more embodiments, the polyurethane dispersion can have a viscosity at 23° C. of at least about 10, 20, or 35 and/or not more than about 600, 200, or 60 centipoise as measured according to DIN 53 019. More particularly, the polyurethane dispersion can have a viscosity at 23° C. in the range of about 10 to 600, 20 to 200, or 35 to 60 centipoise as measured according to DIN 53 019. Due to its low viscosity, the polyurethane dispersion can be ink-jettable. As used herein, "ink-jettable" means that the relevant composition can be printed onto a substrate using an ink jet printer.

Additionally or alternatively, the polyurethane dispersion can have a pH of at least about 4, 5, or 6 and/or not more than about 11, 10, or 9 as measured according to DIN ISO 976. More particularly, the polyurethane dispersion can have a pH in the range of about 4 to 11, 5 to 10, or 6 to 9 as measured according to DIN ISO 976. Furthermore, in various embodiments, the polyurethane dispersion can have a density of at least 0.5, 0.75 or 1.05 and/or not more than 2, 1.5, or 1.2 g/cm³ as measured according to DIN 51 757. More particularly, the polyurethane dispersion can have a density in the range of about 0.5 to 2, 0.75 to 1.5, or 1.05 to 1.2 g/cm³ as measured according to DIN 51 757.

Moreover, the polyurethane dispersion can have a non-volatile content of at least about 10, 25, or 45 and/or not more than about 90, 75, or 53 percent as measured according to DIN EN ISO 3251. More particularly, the polyurethane dispersion can have a non-volatile content in the range of about 10 to 90, 25 to 75, or 45 to 53 percent as measured according to DIN EN ISO 3251. Furthermore, in various embodiments, the polyurethane dispersion can comprise at least about 10, 35, or 50 and/or not more than about 90, 80, or 65 weight percent of polymer solids dispersed in water. More particularly, the polyurethane dispersion can comprise in the range of about 10 to 90, 35 to 80, or 50 to 65 weight percent of polymer solids dispersed in water.

In one or more embodiments, the polyurethane can comprise an anionic polyurethane. In certain embodiments, the polyurethane can comprise a polyurethane latex adhesive. Furthermore, the polyurethane can have a glass transition temperature ("Tg") of at least about −100, −60, or −50 and/or not more than about 70, 30, or −10° C. as measured according to differential scanning calorimetry ("DSC"). More particularly, the polyurethane can have a Tg in the range of about −100 to 70, −60 to 30, or −50 to −10° C. as measured according to DSC.

Exemplary polyurethane dispersions that can be used include, for example, Dispercoll® U 54, Dispercoll® U 53, or Dispercoll® KA-8756 from Bayer Corporation.

As noted above, the adhesive compositions can also comprise at least one stabilizer. A stabilizer can be added to the adhesive composition to enhance the heat and light stability and to also increase the tackiness and plasticity. The stabilizers can also function as antioxidants and can hinder oxidation of the adhesive compositions. The stabilizer can also suppress unwanted polymerization at increased temperatures and thereby increase the flexibility and elongation properties of the composition.

In various embodiments, the adhesive composition can comprise at least about 0.01, 0.1, 0.5, or 1 and/or not more than about 20, 10, 5, or 3 weight percent of the stabilizer. More particularly, the adhesive composition can comprise in the range of about 0.01 to 20, 0.1 to 10, 0.5 to 5, or 1 to 3 weight percent of the stabilizer.

The stabilizer can have a melting point of at least about 5, 10, or 12 and/or not more than about 100, 50, or 30° C. More particularly, the stabilizer can have a melting point in the range of about 5 to 100, 10 to 50, or 12 to 30° C.

In various embodiments, the stabilizer comprises a phenol. In one or more embodiments, this phenol comprises a sterically hindered phenol.

In certain embodiments, the phenol used in the adhesive compositions can comprise the following structure:

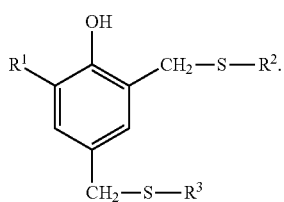

In such embodiments, $R^1$ can comprise an alkyl group having at least 1 and/or not more than 4, 3, or 2 carbon atoms. More particularly, $R^1$ can comprise an alkyl group having 1 to 4, 1 to 3, or 1 to 2 carbon atoms. In some embodiments, $R^1$ comprises a methyl group. Furthermore, in various embodiments, $R^2$ can comprise an alkyl group comprising at least 5, 6, or 7 and/or not more than 12, 10, or 9 carbon atoms. More particularly, $R^2$ can comprise an alkyl group comprising in the range of 5 to 12, 6 to 10, or 7 to 9 carbon atoms. Similarly, in various embodiments, $R^3$ can comprise an alkyl group comprising at least 5, 6, or 7 and/or not more than 12, 10, or 9 carbon atoms. More particularly, $R^3$ can comprise an alkyl group comprising in the range of 5 to 12, 6 to 10, or 7 to 9 carbon atoms.

In one or more embodiments, $R^1$ can comprise a methyl group and $R^2$ and $R^3$ can comprise an alkyl group comprising 8 carbon atoms. In such embodiments, the phenol can have the following structure:

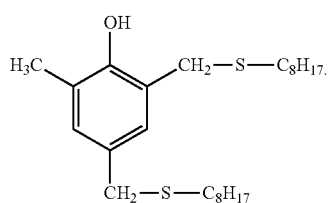

In one or more embodiments, the phenol can comprise 4,6-Bis(octylthiomethyl)-o-cresol. An exemplary stabilizer includes, for example, Irganox® 1520 L from BASF.

In various embodiments, the adhesive composition can comprise a colorant. In certain embodiments, the colorant can be in the form of an ink composition that comprises a pigment and/or dye.

The adhesive composition can comprise at least about 1, 3, 7, or 10 and/or not more than about 40, 25, 20, or 15 weight percent of the colorant. More particularly, the adhesive composition can comprise in the range of about 1 to 40, 3 to 25, 7 to 20, or 10 to 15 weight percent of the colorant.

The colorant can come in a variety of colors, but in certain embodiments, the color white is used. This is because the color white can effectively contrast with the colors in the ink image and thereby can produce a more vivid ink image after it has been deposited on the article as described below.

In certain embodiments, the colorant comprises a pigment. The pigment can comprise, for example, an inorganic pigment and/or an organic pigment. Inorganic pigments can include, for example, silica, alumina, titanium dioxide, zinc sulfide, zinc oxide, antimony oxide, barium sulfate, calcium carbonate, or a combination thereof. Organic pigments can include, for example, polyamides, polyolefins, polyesters, or a combination thereof. The pigments can have average particle sizes of at least 0.1, 0.5, or 1 and/or not more than 10, 5, or 1.5 microns. More particularly, the pigments can have an average particle size in the range of about 0.1 to 10, 0.5 to 5, or 1 to 1.5 microns.

The pigments used herein may be supplied in granular or liquid form. The pigment may also be supplied as a dispersion. As used herein, the term "pigment" refers to an insoluble colorant or solid colorant particles that remain suspended or dispersed when introduced into a carrier fluid. Furthermore, it is to be understood that the term "pigment" is not meant to encompass a dye or water-soluble colorant containing particles that are fully dissolvent in the carrier fluid.

The amount of pigment used in accordance with the present invention can be effective to (1) maximize the curing rate of the adhesive composition, (2) impart the desired color to the adhesive composition and final printed ink image, (3) obtain the desired wetting ability, and/or (4) enhance receptivity to UV or LED energy. An exemplary pigment includes, for example, 21225 White Dispersion from Polymeric Imaging.

In various embodiments, the adhesive composition can comprise one or more solvents. The adhesive composition can comprise at least about 5, 15, or 30 and/or not more than about 90, 65, or 45 weight percent of one or more solvents. More particularly, the adhesive composition can comprise in the range of about 5 to 90, 15 to 65, or 30 to 45 weight percent of one or more solvents. It should be noted that these weight percentages only account for particular solvents that are added by themselves and they do not account for any solvents that may be part of another added component such as, for example, the polyurethane dispersion and/or pigment dispersion.

The solvents can comprise, for example, water; alcohols such as isopropyl alcohol, ethanol, propylene glycol, or dipropylene glycol; ketones such as methyl ethyl ketone, cyclohexanone, or acetone; aromatic hydrocarbons; isophorone; butyrolactone; N-methyl pyrrolidone; tetrahydrofuran, ethers such as lactates, acetates, and the like; ester solvents such as propylene glycol monomethyl ether acetate (PM acetate), diethylene glycol ether acetate (DE acetate), ethylene glycol butyl ether acetate (EB acetate), dipropylene glycol monomethyl acetate (DPM acetate), iso-alkyl esters, iso-hexyl acetate, isoheptyl acetate, isooctyl acetate, isononyl acetate, isodecyl acetate, isododecyl acetate, isotridecyl acetate or other iso-alkyl esters; and combinations thereof.

In one or more embodiments, the adhesive composition is a water-based composition and comprises water. For example, the adhesive composition can comprise at least about 1, 3, or 5 and/or not more than about 40, 20, or 10 weight percent of water. More particularly, the adhesive composition can comprise in the range of about 1 to 40, 3 to 20, or 5 to 10 weight percent of water. Additionally or alternatively, in certain embodiments, the adhesive composition can comprise propylene glycol. For example, the adhesive composition can comprise at least about 1, 5, or 10 and/or not more than about 40, 30, or 20 weight percent of propylene glycol. More particularly, the adhesive composition can comprise in the range of about 1 to 40, 5 to 30, or 10 to 20 weight percent of propylene glycol. Furthermore, in certain embodiments, the adhesive composition can also comprise dipropylene glycol. For example, the adhesive composition can comprise at least about 1, 5, or 10 and/or not more than about 40, 30, or 20 weight percent of dipropylene glycol. More particularly, the adhesive composition can comprise in the range of about 1 to 40, 5 to 30, or 10 to 20 weight percent of dipropylene glycol.

In various embodiments, the adhesive composition comprises one or more surfactants. For example, the adhesive composition can comprise at least about 0.01, 0.05, or 0.1 and/or not more than about 5, 3, or 1 weight percent of one or more surfactants. More particularly, the adhesive composition can comprise in the range of about 0.01 to 5, 0.05 to 3, 0.01 to 1 weight percent of one or more surfactants. The surfactants can include, for example, an acetylene glycol, an amine, or a combination thereof. An exemplary surfactant includes, for example, Surfynol SE-F from Air Products.

In various embodiments, the adhesive composition can comprise a biocide. For example, the adhesive composition can comprise at least about 0.001, 0.01, or 0.1 and/or not more than about 5, 1, or 0.5 weight percent of a biocide. More particularly, the adhesive composition can comprise in the range of about 0.001 to 5, 0.01 to 1, or 0.1 to 0.5 weight percent of a biocide. Exemplary biocides include, for example, aqueous dipropylene glycol solutions of 1,2-benzisothiazolin-3-one available under the name PROXEL from Avecia.

In various embodiments, the adhesive composition can comprise at least one binder. For example, the adhesive composition can comprise at least about 0.01, 0.05, or 0.1 and/or not more than about 5, 3, or 1 weight percent of one or more binders. More particularly, the adhesive composition can comprise in the range of about 0.01 to 5, 0.05 to 3, or 0.1 to 1 weight percent of one or more binders. An exemplary binder includes triethanolamine.

In various embodiments, the adhesive composition can comprise at least one thickener. For example, the adhesive composition can comprise at least about 1, 3, or 9 and/or not more than about 40, 20, or 15 weight percent of a thickener. More particularly, the adhesive composition can comprise in the range of about 1 to 40, 3 to 20, or 9 to 15 weight percent of a thickener. The thickeners can include, for example, glycerine and fatty acid modified polyesters under the names EFKA from EFKA Additives, ACRYSOL products from Rohm and Haas, and TROYSOL from Troy Corporation.

In various embodiments, the adhesive composition can comprise one or more crosslinking agents. For example, the adhesive composition can comprise at least about 0.01, 0.1, or 1 and/or not more than about 10, 5, or 3 weight percent of one or more crosslinking agents. More particularly, the adhesive composition can comprise in the range of about 0.01 to 10, 0.1 to 5, or 1 to 3 weight percent of one or more crosslinking agents. The crosslinking agents can include, for example, aziridines, carbodiimides, amine compounds such as urea formaldehyde compounds and melamine formaldehyde compounds, and combinations thereof. Exemplary crosslinking agents are further described in US 2012/0046378, the entire disclosure of which is incorporated herein by reference.

The adhesive composition can also contain, in addition to the components previously described, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like.

Exemplary compositional ranges for the adhesive composition are summarized in TABLE 1 below. Unless stated otherwise, all composition values herein are in weight percent.

TABLE 1

Exemplary Compositional Ranges of Adhesive Composition (Weight Percent)

| Component | Broad | Intermediate | Narrow |
| --- | --- | --- | --- |
| Polyurethane | 5 to 90 | 10 to 75 | 25 to 65 |
| Stabilizer | 0.01 to 20 | 0.1 to 10 | 0.5 to 5 |
| Colorant | 1 to 40 | 3 to 25 | 7 to 20 |
| Solvent | 5 to 90 | 15 to 65 | 30 to 45 |
| Surfactant | Up to 5 | 0.05 to 3 | 0.01 to 1 |
| Biocide | Up to 5 | 0.01 to 1 | 0.1 to 0.5 |
| Binder | Up to 5 | 0.05 to 3 | 0.1 to 1 |
| Thickener | Up to 40 | 3 to 20 | 9 to 15 |
| Crosslinking Agent | Up to 10 | 0.1 to 5 | 1 to 3 |

The adhesive compositions as described herein can have a low enough viscosity to be used in ink jet printers and, therefore, could be considered ink-jettable. For example, the adhesive composition can have a viscosity at 25° C. of at least about 8, 12, 15, or 18 and/or not more than about 60, 40, 30, or 23 centipoise as measured using a DV-II+ Pro Viscometer from Brookfield. More particularly, the adhesive composition can have a viscosity at 25° C. in the range of 8 to 60, 12 to 40, 15 to 30, or 18 to 23 centipoise.

The low viscosities permit the adhesive composition to be jetted through small diameter piezoelectric inkjet heads having nozzle diameters of between about 15 to about 60 microns. The adhesive compositions can be used in conjunction with heated inkjet heads which serve to lower the viscosity even further. The heated inkjet heads can heat the ink to temperatures of between 25 to 90, 30 to 80, or 35 to 50° C. Another advantage of low viscosity is that smaller drop sizes are possible. For example, the drop size of the compositions can be at least about 10, 20, or 30 and/or not more than about 200, 140, or 80 picoliters. More particularly, the drop size of the compositions can be in the range of about 10 to 200, 20 to 140, or 30 to 80 picoliters.

Image Transfer System

Figure 2:
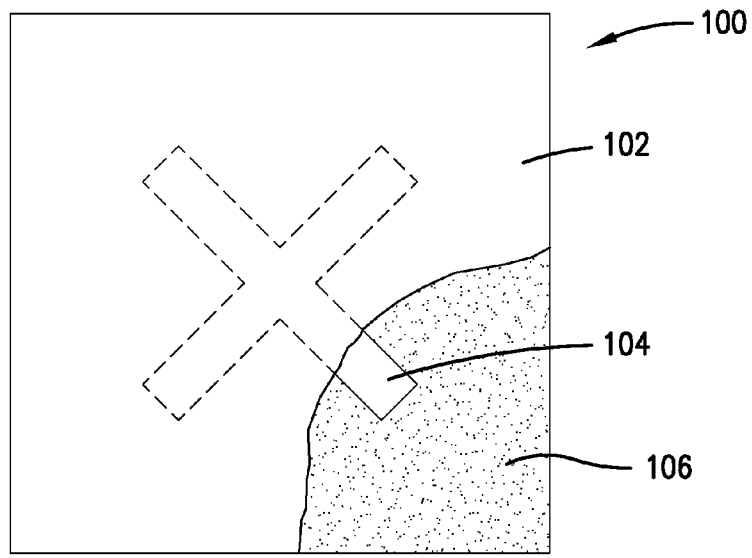
FIG. 2 depicts a top view of an exemplary image transfer system.

As noted above, the adhesive composition described herein can be used to produce an image transfer system. As shown in the side view depicted in FIG. 1, the image transfer system comprises an adhesive layer 12 formed from the adhesive composition, an ink image 14, and a removable transfer substrate 16. FIG. 2 depicts a top view of the image transfer system 100, which has an adhesive layer 102 formed from the adhesive composition that is applied on top of the ink image 104 and transfer substrate 106.

The image transfer system can be produced by first applying an ink image onto at least a portion of the removable transfer substrate to produce an initial image transfer system. Various techniques can be used to apply the ink image to the transfer substrate including, for example, ink jetting, screen printing, spraying, gravure coating, knife coating, brushing, curtain coating, flexography and the like. In various embodiments, the ink image can be digitally printed onto the surface of the transfer substrate using an inkjet printer. Exemplary inkjet printing methods are described in U.S. Pat. No. 8,092, 003, which is incorporated herein by reference in its entirety.

The ink image can be produced using any conventional ink. For example, the ink image can be produced with an ink as described in U.S. Pat. No. 7,427,317; U.S. Pat. No. 7,431, 759; U.S. Pat. No. 7,662,224; U.S. Pat. No. 8,092,003; U.S. 2012/0046378; and U.S. 2013/0131211; each of which are incorporated herein by reference in their entireties.

Since the ink used to produce the ink image can be ink-jettable, it can have a lower viscosity. For instance, the ink can have a viscosity at 25° C. of at least about 8, 12, 15, or 18 and/or not more than about 60, 40, 30, or 23 centipoise as measured using a DV-II+ Pro Viscometer from Brookfield. More particularly, the ink can have a viscosity at 25° C. in the range of 8 to 60, 12 to 40, 15 to 30, or 18 to 23 centipoise.

In various embodiments, the ink image is applied to the transfer substrate in reverse so that it can be viewed correctly once it has been applied to the surface of an article as described below. In one or more embodiments, the ink image will only cover part of the surface of the transfer substrate thereby leaving other portions of the transfer substrate surface still exposed. This is depicted in the embodiment shown in FIG. 2 where the ink image 104 only covers part of the surface of the transfer substrate 106.

The transfer substrate can comprise any conventional transfer substrate known in the art including, for example, transfer paper. In certain embodiments, the transfer substrate can comprise a support substrate having a surface coated with an ink-receptive layer. The support substrate and ink-receptive layer can be produced from a thermoplastic fiber, a natural fiber, or a mixture thereof. Thermoplastic fibers can include, for example, polyamides, polyolefins, polyesters, poly(vinyl chloride), poly(vinyl acetate), polyacrylates, acrylic acid, methacrylic acid, and copolymers and mixtures thereof. Natural fibers can include, for example, cellulose, cotton, and mixtures thereof. Commercial transfer sheets are available, for example, from Avery, Paropy, Epson, and HP.

After applying the ink image onto the transfer substrate, the adhesive composition can be applied on at least a portion of the ink image and transfer substrate by various methods including, for example, ink jetting, screen printing, spraying, gravure coating, knife coating, brushing, curtain coating, flexography, and the like. In various embodiments, the adhesive composition is applied to the ink image and transfer substrate using ink jet printing. Once the adhesive composition has been applied to the initial image transfer system, it will form an adhesive layer that at least partially covers the ink image and transfer substrate. This is shown in FIG. 2, where the adhesive layer 102 covers both the ink image 104 and the transfer substrate 106.

After applying both the ink image and adhesive composition to the transfer substrate, the resulting image transfer system can be dried and cured in an oven at a temperature in the range of 250 to 325° F. for around 2 to 5 minutes in order to ensure that both layers dry and set. It should be noted that this drying step can also occur after applying the ink image and before applying the adhesive composition to form the adhesive layer. Using an inkjet printer, the image transfer systems can be produced at a rate of about 50 to 10,000, 100 to 1,000, or 200 to 500 image transfer systems per hour.

As one skilled in the art would readily appreciate, substantially all of the solvents in the adhesive composition will likely evaporate during the drying and curing steps described above for producing the dried adhesive layer, including the solvents present in any of the other added components. As used herein, "substantially all" means at least 99 percent of the solvent will evaporate during the drying and curing steps. Accordingly, since substantially all of the solvent can evaporate, the resulting adhesive layer can comprise, for example, varying amounts of the polyurethane, stabilizer, and other additives originally found in the adhesive composition. TABLE 2, below, provides exemplary compositional ranges in weight percent for each of the remaining components that can be found in the adhesive layer after the drying and curing steps.

TABLE 2

Exemplary Compositional Ranges of Adhesive Layer

| Component | Broad | Intermediate | Narrow |
| --- | --- | --- | --- |
| Polyurethane | 20 to 97 | 30 to 95 | 50 to 90 |
| Stabilizer | 0.1 to 40 | 1 to 30 | 4 to 20 |
| Colorant | 3 to 60 | 5 to 50 | 10 to 40 |
| Surfactant | Up to 10 | 0.1 to 5 | 0.5 to 3 |
| Biocide | Up to 5 | 0.01 to 4 | 0.1 to 0.2 |
| Binder | Up to 10 | 0.1 to 5 | 0.5 to 3 |
| Crosslinking Agent | Up to 15 | 0.1 to 10 | 1 to 5 |

Applying the Image Transfer System to an Article

The image transfer systems described herein can be used to apply an ink image onto the surface of an article. Generally, this involves (a) heat treating the image transfer system in order to cause the adhesive layer to adhere to the surface of the article and (b) removing the transfer substrate from the image transfer system thereby leaving the adhesive layer and the ink image affixed to the surface of the article.

Figure 3:
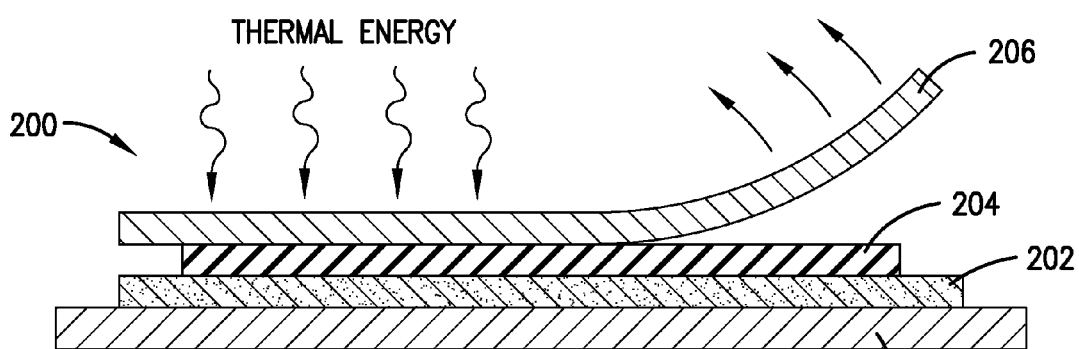
FIG. 3 depicts an exemplary method for applying an ink image onto an article using the image transfer systems described herein.

More specifically, the heating treating step can involve contacting the image transfer system on the adhesion layer side with the surface of the article and applying thermal energy on the other side of the image transfer system (the transfer substrate side) in order to at least partially melt the adhesive layer and thereby cause it to adhere to the surface of the article. These steps are depicted in FIG. 3, which shows that the image transfer system 200 is contacted on the adhesion layer side 202 with the surface of the article 208. Thermal energy is then applied to the image transfer system on the transfer substrate side 206. Once sufficient thermal energy has been applied and the adhesive layer 202 has at least partially melted and adhered to the article surface 208, the transfer substrate 206 is then removed to leave the adhesive layer 202 and ink image 204 affixed on the article surface 208. As shown in FIG. 3, the adhesive layer 202 will separate the ink image 204 from the article surface 208.

The thermal energy can be provided by any conventional means including, for example, a heating press, an iron, or any other heat application system known in the transfer paper art. The thermal energy can be provided at a sufficient rate so as to reach a temperature in the range of 150 to 400, 200 to 350, or 225 to 275° F. In addition, the thermal energy can be applied to the image transfer system for about 5 to 120, 10 to 60, or 15 to 30 seconds.

Furthermore, the heat application step can involve pressing the adhesive layer into the article surface. In various embodiments, the pressing of the adhesive layer into the surface of the article can facilitate its transfer into the fibrous interior of the article, thereby minimizing the thickness of the adhesive layer and ink image when adhered on the article. Accordingly, there can be less film buildup on the surface of the articles since at least some of the adhesive layer can be absorbed into the surface of the article. In one or more embodiments, the ink image and adhesive layer, when adhered to the article surface, can have a combined thickness of at least about 0.1, 0.5, or 1 and/or not more than about 20, 10, or 5 mil as measured from the surface of the article. More particularly, the ink image and adhesive layer, when adhered to the article surface, can have a combined thickness in the range of 0.1 to 20, 0.5 to 10, or 1 to 5 mil as measured from the article surface.

Since the adhesive layer can be at least partially absorbed into the surface of the article and separates the ink image from the article surface, the ink image will not be absorbed directly into the surface the article. This is in contrast to conventional image transfer systems which use a transfer paper to apply an ink image directly onto the article. Consequently, the deposited ink image can appear more vivid and brighter since it is not being actively absorbed into the surface of the article.

The transfer substrate can be removed using any conventional means. In various embodiments, the transfer substrate is removed by simply peeling it away from the adhered adhesive layer and ink image.

In various embodiments, the article comprises a textile. The textile can comprise natural fabrics, synthetic fabrics, or a mixture thereof. Natural fabrics include, for example, cotton, silk, wool, cashmere, hemp, or a combination thereof. Synthetic fabrics include, for example, polyester, acrylic, nylon, acetate, spandex, latex, aramid, or a combination thereof. In one or more embodiments, the article comprises a polyester fabric.

The synthetic fabric can comprise a melting point of at least about 200, 225, or 250° C. and/or not more than about 500, 400, or 300° C. More particularly, the synthetic fabric can comprise a melting point in the range of about 200 to 500, 225 to 400, or 250 to 300° C. The synthetic fabric can also exhibit a percent elongation at break of at least about 5, 10, or 15 and/or not more than about 50, 40, or 30 percent as measured according to ASTM D5035. More particularly, the synthetic fabric can exhibit a percent elongation at break in the range of about 5 to 50, 10 to 40, or 15 to 30 percent as measured according to ASTM D5035. Moreover, in certain embodiments, the synthetic fabric comprises a tenacity of at least about 2, 4, or 5 and/or not more than about 15, 10, or 8 gm/den according to ASTM D3217. More particularly, the synthetic fabric comprises a tenacity in the range of about 2 to 15, 4 to 10, or 5 to 8 gm/den according to ASTM D3217. Furthermore, in certain embodiments, the synthetic fabric comprises a specific gravity in the range of about 1.15 to 1.6, 1.2 to 1.5, or 1.3 to 1.4.

In one or more embodiments, the article comprises a clothing article. Clothing articles can include, for example, pants, shirts, sweaters, jackets, coats, hats, and footwear. In certain embodiments, the clothing article comprises a t-shirt.

In various embodiments, the article has not been pretreated with a chemical agent, such as an acid, prior to applying the ink image and adhesive layer thereon with the image transfer system.

By using the image transfer systems described herein, printing on certain textiles, especially t-shirts, can be done at a significantly faster rate. For example, by using the image transfer system described herein, an ink image can be adequately applied to a textile in about 4 minutes. This is significantly faster compared to conventional image transfer systems which can take up to 15 minutes to adequately apply an ink image onto a textile.

The resulting ink image deposited on the article surface exhibits great durability and maintains its vividness and brightness even after being subjected to multiple washings and/or multiple dry cleaning sessions.

As noted above, the ink image and adhesive layer deposited onto the article surface article can exhibit great durability even after being subjected to multiple washings or dry cleaning sessions. For instance, the deposited ink image and adhesive layer can exhibit dimensional changes of not more than about 10.0×10.0, 5.0×5.0, or 2.0×2.0 percent after being subjected to 25 home launderings according to AATCC 135. This test is intended to determine the durability of the deposited ink image and adhesive layer on the textile surface after being subjected to multiple home laundering procedures used by consumers. The dimensional changes (in percent change) of the tested samples are measured after subjecting the samples to 25 cycles of home launderings. These tests are commonly performed in the industry by the Drycleaning & Laundry Institute (Laurel, Md.).

Similarly, the deposited ink image and adhesive layer can exhibit dimensional changes of not more than about 10.0×10.0, 5.0×5.0, or 2.0×2.0 percent after being subjected to 20 cycles of dry cleaning with perchloroethylene according to AATCC 158. This test is intended to determine the durability of the deposited ink image and adhesive layer on the textile surface after being subjected to multiple dry cleanings using a commercial dry cleaning machine. The dimensional changes (in percent change) of the tested samples are measured after subjecting the samples to 20 cycles of dry cleaning in perchloroethylene. These tests are commonly performed in the industry by the Drycleaning & Laundry Institute (Laurel, Md.).

Additionally, as noted above, the ink image deposited onto the article using the image transfer system described herein can maintain its vividness and brightness even after being subjected to multiple washings. For example, the adhered ink image can exhibit a colorfast score of at least 3, 4, or about 5 as measured according to AATCC 61. The AATCC 61 test shows color change comparable to twenty commercial launderings at 38±3° C. (100+5° F.). The grade ratings were determined through use of the AATCC Gray Scales for Color Change and Staining, which are scored from 1 to 5; in which 5 represents no or negligible change, 4 represents a slight change, 3 represents a noticeable change, and 1 represents much change. According to AATCC, the colorfastness grades of the scale steps and the corresponding total color differences and tolerances used are determined by the CIE L*a*b* (CIELAB) formula. Specific tolerances and instructions for use of the scale are given in AATCC Evaluation Procedure 1. These tests are commonly performed in the industry by the Drycleaning & Laundry Institute (Laurel, Md.).

Likewise, the ink image deposited onto the article using the image transfer system described herein can maintain its vividness and brightness even after being subjected to multiple dry cleaning sessions. For example, the adhered ink image can exhibit a colorfast score of at least 3, 4, or about 5 as measured according to AATCC 132-2009. The colorfastness is measured after the tested samples are subjected to 20 sessions of dry cleaning. The grade ratings were determined through use of the AATCC Gray Scales for Color Change and Staining, which are scored from 1 to 5; in which 5 represents no or negligible change, 4 represents a slight change, 3 represents a noticeable change, and 1 represents much change. According to AATCC, the colorfastness grades of the scale steps and the corresponding total color differences and tolerances used are determined by the CIE L*a*b* (CIELAB) formula. Specific tolerances and instructions for use of the scale are given in AATCC Evaluation Procedure 1. These tests are commonly performed in the industry by the Drycleaning & Laundry Institute (Laurel, Md.).

Furthermore, the adhesive layer formed from the adhesive compositions described herein can form a strong bond between the ink image and the surface of the article. For example, the adhesive layer can exhibit an adhesive strength of at least about 1, 3, or 6 lbs/in and/or not more than about 100, 50, or 25 lbs/in as measured according to ASTM D751-06. More particularly, the adhesive layer can exhibit an adhesive strength in the range of about 1 to 100, 3 to 50, or 6 to 25 lbs/in as measured according to ASTM D751-06.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

An adhesive composition was produced based on the formulation depicted in TABLE 3 below. The resulting adhesive composition had a viscosity at 25° C. of about 20 centipoise as measured using a DV-II+ Pro Viscometer and was capable of being applied to a substrate using an inkjet printer.

TABLE 3

| Component | Commercial Source | Weight Percent |
|---|---|---|
| DISPERCOLL U-54 | BAYER | 41 |
| TRIETHYANOLAMINE | BARTON | 0.1 |
| GLYCERINE | BARTON | 10 |
| 21225 WHITE DISPERSION | POLYMERIC IMAGING | 13 |
| SURFYNOL SE-F | AIR PRODUCTS | 0.4 |
| PROXELL GXL | AVECIA | 0.1 |
| PROPYLENE GLYCOL | BARTON | 13.2 |
| DIPROPYLENE GLYCOL | BARTON | 13.2 |
| WATER | IN HOUSE | 8 |
| IRGANOX 1520 L | BASF | 1 |

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "about" means that the associated value can vary by 10 percent from the recited value.

What is claimed is:

1. An ink-jettable adhesive composition, said composition comprising:

an ink-jettable polyurethane dispersion; and a phenol based on the following formula:

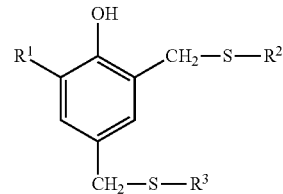

wherein $R^1$ is an alkyl group having 1 to 4 carbon atoms, $R^2$ is an alkyl group comprising 5 to 12 carbon atoms, and $R^3$ is an alkyl group comprising 5 to 12 carbon atoms, wherein said composition has a viscosity at 25° C. of at least 8 and not more than about 60 centipoise.

2. The adhesive composition of claim 1, wherein said adhesive composition comprises at least about 10 and not more than about 75 weight percent of the polyurethane dispersion.

3. The adhesive composition of claim 1, wherein said polyurethane dispersion has a viscosity at 23° C. of at least 10 and not more than 60 centipoise and a glass transition temperature ("Tg") of at least −100 and not more than 30° C.

4. The adhesive composition of claim 1, wherein said adhesive composition comprises at least about 0.1 and not more than about 10 weight percent of said phenol.

5. The adhesive composition of claim 1, wherein said $R^2$ and $R^3$ comprise an alkyl group comprising 7 to 9 carbon atoms.

6. The adhesive composition of claim 1, further comprising:

at least about 1 and not more than about 25 weight percent of a pigment; and at least about 5 and not more than about 90 weight percent of one or more solvents, wherein said solvents comprise water.

7. The adhesive composition of claim 6, wherein said solvents further comprise propylene glycol, dipropylene glycol, or a mixture thereof.

8. The adhesive composition of claim 1, wherein said adhesive composition has a viscosity at 25° C. of at least about 15 and not more than about 30 centipoise.

9. An image transfer system for transferring an image to an article, said system comprising:

a removable transfer substrate;

an ink image printed on at least a portion of said substrate; and an adhesive layer printed on at least a portion of said substrate and said ink image, wherein said adhesive layer comprises a polyurethane and a phenol based on the following formula:

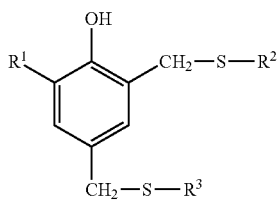

wherein R¹ is an alkyl group having 1 to 4 carbon atoms, R² is an alkyl group comprising 5 to 12 carbon atoms, and R³ is an alkyl group comprising 5 to 12 carbon atoms.

10. The image transfer system of claim 9, wherein said adhesive layer comprises in the range of about 50 to 90 weight percent of said polyurethane and in the range of about 1 to 20 weight percent of said phenol.

11. The image transfer system of claim 9, wherein said polyurethane has a glass transition temperature ("Tg") of at least −100 and not more than 30° C.

12. The image transfer system of claim 9, wherein said R¹ comprises a methyl group.

13. The image transfer system of claim 9, wherein said R² and R³ comprise an alkyl group comprising 7 to 9 carbon atoms.

14. The image transfer system of claim 9, wherein said adhesive layer further comprises a pigment.

15. A method for applying an image to an article, said method comprising:
(a) providing an image transfer system comprising a removable transfer substrate, an ink image printed on at least a portion of said transfer substrate, and an adhesive layer printed on at least a portion of said transfer substrate and said ink image, wherein said adhesive layer comprises a polyurethane and a phenol based on the following formula:

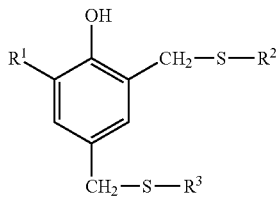

wherein R¹ is an alkyl group having 1 to 4 carbon atoms, R² is an alkyl group comprising 5 to 12 carbon atoms, and R³ is an alkyl group comprising 5 to 12 carbon atoms;
(b) heat treating said image transfer system in order to adhere said adhesive layer of said image transfer system to a surface of said article; and
(c) removing said transfer substrate from said image transfer system thereby affixing said adhesive layer and said ink image on said article, wherein said adhesive layer is between said ink image and said surface of said article.

16. The method of claim 15, wherein said heat treating of step (b) comprises contacting said adhesive layer with said surface of said article and applying thermal energy to said image transfer system on the side of said transfer substrate in order to at least partially melt said adhesive layer.

17. The method of claim 15, wherein said adhesive layer comprises in the range of about 50 to 90 weight percent of said polyurethane and in the range of about 1 to 20 weight percent of said phenol.

18. The method of claim 15, wherein said R² and R³ comprise an alkyl group comprising 7 to 9 carbon atoms.

19. The method of claim 15, wherein said adhesive layer further comprises a pigment.

20. The method of claim 15, wherein said article comprises a synthetic fabric.

21. The method of claim 15, wherein said affixed ink image and adhesive layer have a combined thickness of at least about 0.1 and not more than about 20 mil as measured from said surface of said article.

22. An article having an image deposited thereon, said article comprising:
an adhesive layer affixed to a surface of said article, wherein said adhesive layer comprises a polyurethane and a phenol based on the following formula:

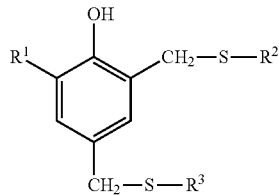

wherein R¹ is an alkyl group having 1 to 4 carbon atoms, R² is an alkyl group comprising 5 to 12 carbon atoms, and R³ is an alkyl group comprising 5 to 12 carbon atoms; and
an ink image affixed to said adhesive layer,
wherein said adhesive layer is between said ink image and said surface of said article.

23. The article of claim 22, wherein said adhesive layer comprises in the range of about 50 to 90 weight percent of said polyurethane and in the range of about 1 to 20 weight percent of said phenol.

24. The article of claim 22, wherein said R² and R³ comprise an alkyl group comprising 7 to 9 carbon atoms.

25. The article of claim 22, wherein said affixed ink image and adhesive layer have a combined thickness of at least about 0.1 and not more than about 10 mil as measured from said surface of said article.

26. The article of claim 22, wherein said affixed ink image and adhesive layer exhibit dimensional changes of not more than about 10.0×10.0 percent after being subjected to 25 home launderings according to AATCC 135.

27. The article of claim 22, wherein said ink image exhibits a colorfast score of at least 4 as measured according to AATCC 61.

28. The article of claim 22, wherein said adhesive layer exhibits an adhesive strength to the article surface of at least about 1 and not more than about 50 lbs/in as measured according to ASTM D751-06.

\* \* \* \* \*